J. GAINEY.
FILTERING APPARATUS.
No. 191,131.  Patented May 22, 1877.
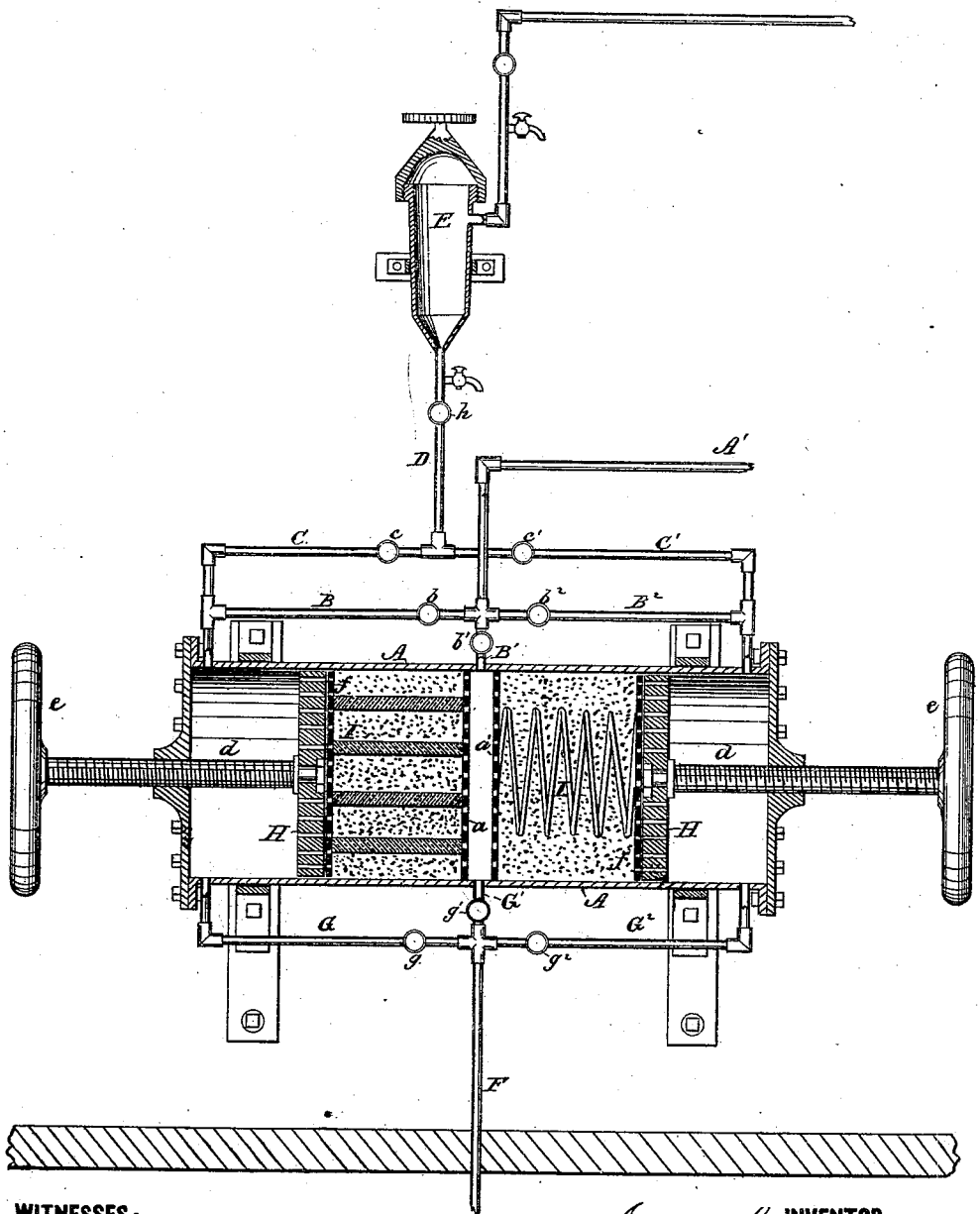
WITNESSES:  
W. W. Hollingsworth  
Edw. W. Byrn
INVENTOR:  
James Gainey  
BY  
ATTORNEYS.

UNITED STATES PATENT OFFICE.

JAMES GAINEY, OF AUGUSTA, GEORGIA.

IMPROVEMENT IN FILTERING APPARATUS.

Specification forming part of Letters Patent No. 191,131, dated May 22, 1877; application filed May 3, 1877.

*To all whom it may concern:*

Be it known that I, JAMES GAINEY, of Augusta, in the county of Richmond and State of Georgia, have invented a new and Improved Filtering Apparatus; and I do hereby declare that the following is a full, clear, and exact description of the same, reference being had to the accompanying drawing, forming part of this specification, in which the figure is a sectional elevation.

My invention relates to a novel construction of filter, designed more particularly for filtering and purifying water for household purposes, but applicable to the filtration of all kinds of liquids.

It consists in an adjustable plunger for compressing the filtering material, to adapt the device to filter under varying pressures, in combination with the specific means for passing the water through the filtering-chamber in the opposite direction, to cleanse the filter without reversing the position of the same.

It also further consists in locating an expansible spring directly in the filtering material, so that when the pressure of the plunger is relieved, the movement of the spring in expanding loosens up the filtering material, to adapt it to be thoroughly cleansed by the passage of the water through it in the opposite direction, all as hereinafter more fully described.

In the drawing, A represents the filtering-chamber, which may be of any size, located in any position, and constructed of any material. Such chamber I prefer, however, to make in cylindrical form, of galvanized iron, of such thickness as will enable it to stand the varying pressures to which it may be subjected, and for ordinary household purposes the same will be about thirty-six inches in length and six inches in diameter.

As here shown, this cylinder is arranged, with respect to its communicating pipes, so as to filter in either direction from one end to the other, and to be washed or cleansed in either direction, or to filter in both directions from the center, and be washed in both directions from the ends to the center.

$A'$ is the common or general inlet supply-pipe, leading from the water-main, the river, reservoir, or other source of water supply requiring purification. This pipe leads into the special supply-pipes B $B^1$ $B^2$, each of which is provided with a valve, $b$ $b^1$ $b^2$, of which pipes B and $B^2$ communicate with the cylinder at opposite ends, while $B^1$ opens into the cylinder at the center between the two perforated partitions $a$ $a'$.

C C' are outlet-pipes for the purified water, each of which is provided with a valve, $c$ $c'$, which pipes open into opposite ends of the cylinder through the end section of pipes B $B^2$. These pipes C C' open, through a pipe, D, and valve $h$, into a secondary filter, E, and communicate through the same with the pipes in the house.

F is a general discharge-outlet for the muddy water when the apparatus is being cleaned, which pipe opens into the several discharge-pipes G $G^1$ $G^2$, having valves $g$ $g^1$ $g^2$, of which pipes G and $G^2$ communicate with the opposite ends of the cylinder, while $G^1$ opens into the space at the center between the partitions $a$ $a'$.

In the opposite ends of the cylinder are arranged perforated plungers H, swiveling upon screw-threaded stems $d$, which latter are arranged in interiorly-threaded bearings in the cylinder-heads, and are rotated by means of rigid hand-wheels $e$, or other suitable means upon the outside, to move the plungers to or from the center. In between the plungers H and the partitions $a$ $a'$ is arranged the filtering material, which consists of powdered charcoal, or any other approved substance for the purpose. Embedded in the charcoal is arranged a spring, I, attached at one end to one of the partitions $a$ $a'$, and at the other to a movable perforated head, $f$. The object of this spring is to permit, by its expansion when the pressure of the plunger is relieved, the lightening or loosening up of the filtering material, so that, in cleansing the filter by passing the water through it in the opposite direction, the compactness of the material and the cementing effect of the mud is broken up, so as to permit the ready washing of the water through the material, and the proper cleansing of the same. For this purpose I may use a spiral spring, as shown upon the right, or I may use a series of rubber springs, as shown upon the left; in the latter case the packing of the charcoal upon the sides of the rubber strips being sufficiently tight to prevent the bending of the strips, and compel them to have, when relieved of the pressure of the plunger, an endwise movement, which results in the desired loosening of the material.

The operation of the filter is as follows: When the filtering is to be effected from right to left, the valves $b^2$, $c$, and $h$ are opened and the rest closed. Water entering at A' passes down through $B^2$ into the water-space of the cylinder; thence through the filtering material and up pipes C and D to the filter E, and thence to the point of utilization. To filter in the reverse direction, $b^2$ and $c$ are closed, and $b$ and $c'$ are opened. Water then passes from A' to B; thence into the cylinder and through the filtering material, and out through C' to D, and thence through the secondary filter, &c. To filter in both directions, $b$ is closed, and $b^1$ and $c$ $c'$ are opened. Water then passes between partitions $a$ $a'$, and moves from the center both ways through the filtering material, and out the ends of the cylinder, through pipes C C', to the pipe D and C. After filtering from right to left, (valve $b^2$ and $c$ being open,) to wash or cleanse the filter, $b^2$ and $c$ are closed, and $b$ and $g^2$ are opened. Water then passes in the reverse direction through the filter, and out the discharge-pipes $G^2$ and F. After filtering from left to right, (valve $b$ and $c'$ being open,) to cleanse the filter, $b$ and $c'$ are closed, and $b^2$ and $g$ are opened. Water then passes in the opposite direction through the filter, and out the discharge-pipes G and F. After filtering in both directions from the center, (valves $b^1$ and $c$ $c'$ being open,) to cleanse the filter, $b^1$ $c$ $c'$ are closed, and $b$ $b^2$ and $g^1$ opened. Water then passes through B and $B^2$ to the ends of the filter; thence to the center in opposite directions, and out at $G^1$ and F.

From the above description, it will be seen that the filter operates from left to right, or from right to left, or in both directions at once, and is also self-cleansing for all of these directions. Furthermore, after the material in the filter has been washed, as thus described, it may be still further cleansed or rinsed by simply opening a cock in the upper stories of a house, and allowing the purified water to pass, from hydrostatic pressure, back through the filtering medium.

In making use of my filter, the same is designed more particularly to operate from pressure which may vary from the thirty to forty pounds of water-pressure in the city mains up to an artificial pressure of two hundred pounds, or more, produced by a steam-pump or other means. For this reason I have provided the filter with an adjustable plunger, as shown and described, to compress the filtering material to suit the varying pressures employed. In thus compressing the filtering material, however, some means are required for the loosening up of the same, to permit the removal of the accumulated sediment, and such need I have supplied in a simple and effective manner by the embedding of springs in the filtering material, as before described.

In applying my invention for household purposes, I may not use the filter in the form shown in the drawing adapted to filtration and cleansing in three different ways; but I may construct the same to filter simply in one direction, and to be washed or cleansed in the other.

In locating the filter, also, one desirable mode is to arrange it in vertical position, buried in the ground, in connection with the water-main outside of the house, with only the hand-wheel, the valve-connections, and the cylinder-head projecting, the apparatus being, of course, here employed in its single and not in its duplicate form. When thus buried it is out of the way, and occupies no room in the house; and by making the inlet to the filter twice the size of the outlet, I am enabled to carry the purified water into the house in continuous and undiminished supply.

The object of the secondary filter E is simply to retain any shreds or fibers of the purifying material which may pass off. This filter E forms no part of my invention, being simply introduced to give completeness to the apparatus for some uses to which it may be applied. It is packed with sponge by removing its cover, and is provided with an outlet-cock above and below the same. After washing out the filter A, the water is examined at these two cocks of the secondary filter to determine the purity of the water, and to thus enable the operator to know whether the filter is thoroughly cleansed.

Having thus described my invention, what I claim as new is—

1. The combination, with a filter, of an expansible spring arranged in the filtering material, for the purpose of loosening the same, as described.

2. A filter provided with an adjustable plunger, and having an inlet supply-pipe arranged upon the side thereof, communicating, as desired, with either end of the filter through valves, and having also a muddy-water discharge-pipe and a clear-water discharge-pipe, with controlling-valves, substantially as and for the purpose described.

3. The combination of the filter A, the spring I, the perforated head $f$, and the adjustable plunger H, substantially as and for the purpose described.

4. The filter A, provided with two adjustable plungers, H, and perforated partitions $a$ $a'$, in combination with the pipes C C', the pipes B $B^1$ $B^2$ and G $G^1$ $G^2$, having valve-connection and communicating with the filter, substantially as described.

JAS. GAINEY.

Witnesses:
SOLON C. KEMON,
EDWD. W. BYRN.